US007824030B2

(12) United States Patent
Laney et al.

(10) Patent No.: US 7,824,030 B2
(45) Date of Patent: Nov. 2, 2010

(54) EXTRUDED OPEN-CELLED INK-RECEIVING LAYER COMPRISING HYDROPHILIC POLYMER FOR USE IN INKJET RECORDING

(75) Inventors: Thomas M. Laney, Spencerport, NY (US); Narasimharao Dontula, Rochester, NY (US); Kenneth W. Best, Jr., Hilton, NY (US)

(73) Assignee: Eastman Kodak Company, Rochester, NY (US)

( * ) Notice: Subject to any disclaimer, the term of this patent is extended or adjusted under 35 U.S.C. 154(b) by 1248 days.

(21) Appl. No.: 11/210,169

(22) Filed: Aug. 23, 2005

(65) Prior Publication Data

US 2007/0054070 A1 Mar. 8, 2007

(51) Int. Cl.
*B41J 3/407* (2006.01)
*B41M 5/52* (2006.01)
*B32B 37/18* (2006.01)
*B29C 47/00* (2006.01)

(52) U.S. Cl. ................. 347/106; 428/32.31; 428/32.32; 428/32.34; 428/32.38; 156/77; 156/229; 156/244.11

(58) Field of Classification Search ..... 428/32.1–32.38; 347/105; 156/77, 229, 244.11
See application file for complete search history.

(56) References Cited

U.S. PATENT DOCUMENTS

| | | | | |
|---|---|---|---|---|
| 5,846,637 | A * | 12/1998 | Malhotra et al. | 430/124.54 |
| 6,379,780 | B1 | 4/2002 | Laney et al. | |
| 6,403,202 | B2 | 6/2002 | Gu et al. | |
| 6,409,334 | B1 | 6/2002 | Campbell et al. | |
| 6,489,008 | B1 | 12/2002 | Campbell et al. | |
| 6,623,841 | B1 | 9/2003 | Venkatasanthanam et al. | |
| 6,726,981 | B1 | 4/2004 | Steinbeck et al. | |
| 6,753,080 | B1 * | 6/2004 | Sebastian et al. | 428/364 |
| 6,790,491 | B2 | 9/2004 | Sebastian et al. | |
| 6,793,860 | B2 | 9/2004 | Xing et al. | |
| 6,872,501 | B2 * | 3/2005 | Majumdar et al. | 430/201 |
| 6,902,267 | B2 * | 6/2005 | Ohya et al. | 347/104 |
| 7,074,465 | B2 * | 7/2006 | Campbell et al. | 428/32.17 |
| 2002/0001697 | A1 * | 1/2002 | Xing et al. | 428/195 |
| 2003/0036479 | A1 * | 2/2003 | Majumdar et al. | 503/227 |
| 2003/0073577 | A1 * | 4/2003 | Majumdar et al. | 503/227 |
| 2003/0235681 | A1 * | 12/2003 | Sebastian et al. | 428/195.1 |
| 2004/0258857 | A1 * | 12/2004 | Dagan et al. | 428/32.6 |
| 2005/0112302 | A1 * | 5/2005 | Laney et al. | 428/32.31 |
| 2005/0134667 | A1 * | 6/2005 | Campbell et al. | 347/105 |

FOREIGN PATENT DOCUMENTS

| | | | |
|---|---|---|---|
| JP | 11321072 | A * | 11/1999 |
| JP | 2002146071 | A * | 5/2002 |

OTHER PUBLICATIONS

Machine translation of detailed description of JP 11-321072 A. Imported as JP11_321072detail.pdf.*

Polymer Chemistry: The Glass Transition, from http://faculty.uscupstate.edu/llever/Polymer%20Resources/GlassTrans.htm on Oct. 29, 2008. Imported as GlassT_PET.pdf.*

* cited by examiner

*Primary Examiner*—Mark Ruthkosky
*Assistant Examiner*—Gerard T Higgins
(74) *Attorney, Agent, or Firm*—Chris P. Konkol; Andrew J. Anderso

(57) ABSTRACT

An inkjet recording element comprising a support extrusion coated with a porous hydrophilic material. The composition comprises a hydrophilic thermoplastic polymer and blends thereof. Also disclosed are methods for making and a method of printing on the inkjet recording element.

34 Claims, No Drawings

EXTRUDED OPEN-CELLED INK-RECEIVING LAYER COMPRISING HYDROPHILIC POLYMER FOR USE IN INKJET RECORDING

CROSS-REFERENCE TO RELATED APPLICATIONS

The present application is related to U.S. application Ser. No. 11/099,398, filed Apr. 5, 2005 by Dontula et al., and titled, "EXTRUDED INK-RECEIVING LAYER FOR USE IN INKJET RECORDING."

FIELD OF THE INVENTION

The present invention relates to an inkjet recording element that comprises, on a support, a hydrophilic ink-receiving layer made using an extruded sheet material. The extruded sheet material comprises one or more hydrophilic polymers comprising voids formed employing voiding agents. Also disclosed is a method for making the inkjet recording element according to the present invention and a method of printing on an inkjet recording element according to the present invention.

BACKGROUND OF THE INVENTION

In a typical inkjet recording or printing system, ink droplets are ejected from a nozzle at high speed towards a recording element or medium to produce an image on the medium. The ink droplets, or recording liquid, generally comprise a recording agent, such as a dye or pigment, and a large amount of solvent. The solvent, or carrier liquid, typically is made up of water, an organic material such as a monohydric alcohol, a polyhydric alcohol, or mixtures thereof.

An inkjet recording element typically comprises a support having on at least one surface thereof one or more ink-receiving or image-forming layers, and includes those intended for reflection viewing, which have an opaque support, and those intended for viewing by transmitted light, which have a transparent support.

In order to achieve and maintain high quality images on such an inkjet recording element, the recording element must exhibit no banding, bleed, coalescence, or cracking in inked areas; exhibit the ability to absorb large amounts of ink (including carrier liquid) and dry quickly to avoid blocking; exhibit high optical densities in the printed areas; exhibit freedom from differential gloss; exhibit high levels of image fastness to avoid fade from contact with water, fade from radiation by daylight, tungsten light, or fluorescent light, or fade from exposure to gaseous pollutants; and exhibit excellent adhesive strength so that delamination does not occur.

An inkjet recording element that simultaneously provides an almost instantaneous ink dry time and good image quality is desirable. However, given the wide range of ink compositions and ink volumes that a recording element needs to accommodate, these requirements of inkjet recording media are difficult to achieve simultaneously.

Inkjet recording elements tend to fall into broad categories, porous media and non-porous or swellable media. A typical swellable inkjet recording element from the prior art comprises a topcoat ink-receiving layer containing hydroxypropylmethyl cellulose, poly(vinyl alcohol) and/or polyurethane. Such a topcoat layer is typically applied to a surface of a base layer, using a solvent that is subsequently removed by drying, and is specially formulated to provide ink receptive properties.

Hence, current methods for applying water-soluble polymers onto substrates involve dissolving the polymers and other additives in a carrier fluid to form a coating solution. Suitable carrier fluids may comprise organic solvents and/or water. The coating solution is then applied to the substrate by a number of coating methods, such as roller coating, wire-bar coating, dip coating, air-knife coating, curtain coating, slide coating, blade coating, doctor coating, and gravure coating. In some instances, the coating solution may be extruded as a solution using a slot-die.

The major disadvantage with using such conventional coating methods is that an active drying process is required to remove water or solvent from the coating after the coating has been applied to the substrate. Typically, these drying processes use thermal ovens, and there is a limited choice of substrates that can be conveniently dried in such ovens. Many substrates do not have adequate thermal resistance. These drying processes can also place the ink-jet media manufacturer at a competitive cost disadvantage. For example, the speed of a media manufacturing line is limited by the slow drying rate of the coatings. The cost problems are compounded when multiple coatings, requiring multiple drying steps, are applied to the media.

Besides the manufacturing limitations, the media produced by conventional coating methods are known to lack durability and, because most topcoat formulations contain water-soluble components and, thus, are also sensitive to moisture, so that the use, after printing, of a protective overlaminate layer or the like may be desirable. Additionally, the level of active components in the topcoat formulation can be limited by the viscosity of the topcoat formulation that can be handled in the coater. As a result, the efficiency of the topcoat is commonly increased by increasing the layer thickness, which is known to introduce increased costs and coat weight inconsistencies, which inconsistencies are undesirable because they can adversely affect the performance of the final product.

In contrast to solvent coating, hot-melt extrusion coating technology is a high-speed process. Extrusion coating technology is conventionally used in the packaging industry. In such coating processes, hot-melt extrudable compositions that contain little or no organic solvents or water, are extruded onto a substrate. By employing various thermoplastic resins, such as polyolefins and ethylene copolymers, extrusion coatings can provide strength, moisture vapor barriers, oxygen barriers, gas permeability, abrasion resistance, flame retardancy, flexibility, and elasticity for packaging and other industrial products.

In an effort to avoid the above-mentioned adverse consequences of the conventional coating methods for the manufacture of inkjet recording elements, melt extrusion of ink-receiving layers has been tried. However, in the case of non-porous or swellable ink-receiving layers, many water-soluble polymers, such as high molecular weight polyvinyl pyrrolidone, polyvinyl alcohol, natural polymers, and gums, are not suitable for forming hot-melt extrudable compositions, because these materials tend to degrade and decompose at their melting point temperatures. Hydrophilic thermoplastic polymers tend to decompose at the higher temperatures typically employed in melt extrusion. Hydrophilic materials are also so difficult to extrusion coat because they have poor melt strength. Thus, melt extrusion of ink-receiving layers has had limited use.

U.S. Pat. No. 6,726,981 to Steinbeck et al. relates to a recording material for inkjet printing having an extruded polymer layer that comprises a polyether group-containing thermoplastic copolymer, including polyether amide block copolymers having a polyamide segment and a polyether segment. Further thermoplastic polymers in mixture with the copolymer are listed including polyolefins, ethylene copolymers, polyesters, polycarbonates, polyurethanes, and/or extruded polyvinyl alcohol homopolymers and copolymers, wherein the thermoplastic polymers can be present in the amount of 1 to 50 weight percent based on the polymer mixture. The inkjet recording element can further have an ink-absorbing layer applied as an aqueous solution or dispersion.

U.S. Pat. No. 6,403,202 to Gu et al. discloses a recording material for inkjet printing having an extrudable polyvinyl alcohol containing layer which is extruded on raw base paper, and an ink-receiving layer which is applied as an aqueous dispersion or solution. The patent discloses the optional addition of other polymers (without specifying amounts), which list includes polyurethanes, polyolefins, ethylene copolymers, polyalkylene oxides, polycarbonates, polyesters, polyamides and polyesteramides.

U.S. Pat. No. 6,623,841 to Venkatasanthanam et al. discloses an ink receptive layer that is formed from a melt processable blend of a water-soluble polymer and a substantially water-insoluble polymer, in the amounts, respectively, of 20 to 80 weight percent for each polymer. Preferred water-soluble polymers include polyvinyl alcohols and polyalkyloxazolines. The substantially water-insoluble polymer component of the blend is selected from polyolefins, polyesters, polystyrenes, and mixtures thereof. A particularly preferred alcohol/aliphatic polyester blend is one that comprises 20 to 80 percent by weight of each polymer. A particularly preferred alcohol/polyester blend comprises approximately 60 percent by weight of the aliphatic polyester and approximately 40 percent by weight of the polyvinyl alcohol.

U.S. Pat. No. 6,793,860 to Xing et al. discloses a method for making ink-jet recording media using hot-melt extrudable ink-receptive compositions. The melt-extrudable compositions comprise a blend of a melt-extrudable polyvinyl alcohol composition and, in addition, poly(2-ethyl-2-oxazoline), a hydrolyzed copolymer of ethylene and vinyl acetate, ethylene/acrylic acid copolymers, or ethylene/methacrylic acid copolymers.

The above-mentioned patents are not directed to extruded voided image-receiving layers. However, inkjet recording elements that employ extruded porous layers that act as suitable ink-receiving layers on one or both sides of a support are also known. For example, U.S. Pat. No. 6,379,780 to Laney et al., U.S. Pat. No. 6,489,008, and U.S. Pat. No. 6,409,334 to Campbell et al. the disclosures of which are hereby incorporated by reference, discloses an inkjet recording element comprising an ink-permeable polyester substrate comprising a base polyester layer and an ink-permeable upper polyester layer, the upper polyester layer comprising a continuous polyester phase having an ink absorbency rate resulting in a dry time of less than about 10 seconds and a total absorbent capacity of at least about 14 $cc/m^2$, the substrate having thereon a porous image-receiving layer having interconnecting voids.

U.S. Pat. No. 5,443,780 to Matsumoto et al. discloses the use of an oriented film of polylactic acid and methods for producing the same. U.S. Pat. No. 5,405,887 to Morita et al. discloses breathable, hydrolysable, porous films made by a process comprising adding finely powdered filler having an average particle size of 0.3 to 4 μm to a polylactic acid based resin. Such films are described as useful as a material for leak proof films of sanitary materials and packaging materials. Such materials are, therefore, not open-pore in nature.

Commonly assigned U.S. Ser. No. 10/722,886 to Laney et al., hereby incorporated by reference in its entirely, discloses an inkjet recording element comprising an ink-permeable microvoided layer comprising a continuous phase that is a polylactic-acid-based material.

Commonly assigned U.S. Ser. No. 10/742,164 to Campbell et al., hereby incorporated by reference in its entirely, discloses an inkjet recording element comprising a porous ink-receiving layer over and adjacent to an ink-permeable microvoided substrate layer comprising a polyester ionomer, said substrate layer comprising 5 to 70 percent by weight solids of a neutral polyester; 5 to 40 percent by weight solids of a polyester ionomer; and 25 to 65 percent by weight of a voiding agent, wherein the microvoided substrate layer and the porous ink-receiving microvoided layer both having interconnecting voids. In one preferred embodiment of the invention, the ink-permeable polyester microvoided substrate layer comprises sulfonated polyester and the ink-permeable microvoided layer comprising a continuous phase is a polylactic-acid-based material.

U.S. Pat. No. 6,790,491 to Sebastion et al. discloses a biaxially oriented, melt-processed image-receptive film comprising an immiscible blend of at least one semicrystalline polymer component, at least one ink absorptive polymer component, and at least one inorganic filler. However, this inkjet recording element is designed for solvent-based inks, not aqueous inks as intended to be used with the present invention.

It is an object of this invention to provide an inkjet recording element that has a fast ink dry time. It is another object of this invention to provide an inkjet recording element that provides a more robust material for a support.

Extrusion of an image-receiving layer for an inkjet recording element is an economical method of manufacture, but compared to common coating techniques, it is difficult to achieve the desired properties of an image-receiving layer for use in inkjet recording. There are many unsolved problems in the art and many deficiencies in the known products, which have severely limited their commercial usefulness. A major challenge in the design of an image-recording element is to provide improved picture life, a critical component of which is resistance to light fade.

It would be desirable to have new methods for making ink-jet recording media that are capable of forming high-quality, multicolored images with aqueous-based inks from inkjet printers. The present invention provides such methods and the resulting media. It is an object of this invention to provide a multilayer inkjet recording element that has excellent image quality and improved picture life. It would be desirable to obtain low ozone fade in an instant dry media.

SUMMARY OF THE INVENTION

These and other objects are achieved by the present invention which comprises a inkjet recording element comprising a support having thereon a swellable, porous image-receiving layer comprising at least one hydrophilic thermoplastic polymer, in a continuous phase, and interconnecting voids (also known as open-cell voiding), where voids contain inorganic and/or organic void initiating particles. This is created by extruding a layer of hydrophilic polymer, optionally co-extruded with a base layer that may or may not be voided, and then stretched.

In a preferred embodiment, the hydrophilic thermoplastic polymer in the ink-receiving layer has a $T_g$ that greater than 50° C., preferably between 50° C. and 65° C. The at least one hydrophilic thermoplastic polymer in the image-receiving layer, in total, is present in an amount of at least 30% by weight of the polymer in the image-receiving layer.

The resulting images were tested for ozone fade and shown to be significantly superior relative to commercial open-cell/instant-dry inkjet medias.

The terms "ink-receiving layer" or "ink-receptive layer" (also referred to as "hydrophilic absorbing layers") as used herein is intended to mean a layer that is capable of receiving or absorbing aqueous-based inkjet inks. Hence, it should have good water absorptivity and be fast drying. An inkjet recording element can comprise several ink-receiving layers on a support. An ink-receiving layer can be specially intended, as its main function, to absorb either carrier fluid or ink colorant. The term "image-receiving layer" as used herein is intended to refer to an ink-receiving layer that usually contains the principal amount of imaged ink after the ink is applied and dried, or at least is the layer with the most amount of imaged ink in the media is an image-receiving layer even if more than one image-receiving layer is present and additional image-receiving layers may bee present adjacent and under an upper image-receiving layer. For this reason, the image-receiving layer may optionally comprise a mordant for the ink (colorant) and is relatively thick compared to the optional layers above it. It is possible for the image-receiving layer to be divided into more than one layer such that the layers cumulatively contain the principal amount of imaged ink. The term "base layer" as used herein is intended to mean the layer or layers below the image-receiving layer that is intended to absorb a substantial amount of carrier fluid after the ink is applied.

Another aspect of the invention relates to a method of making the inkjet recording element and is also disclosed. Such a method of making an inkjet recording element comprises:

(a) blending inorganic particles into a melt comprising at least one hydrophilic thermoplastic polymer, in a continuous phase, and inorganic and/or organic void initiating particles;

(b) forming a sheet comprising a layer of the melt by extrusion;

(c) stretching the sheet biaxially to form interconnected microvoids around the inorganic or organic particles to form an image-receiving layer comprising at least one hydrophilic thermoplastic polymer, in a continuous phase, and interconnecting voids, where voids contain the inorganic and/or organic void initiating particles; and (d) applying the biaxially stretched sheet over a support.

In a preferred embodiment, the image-receiving layer is stretched at a temperature of under 75° C. The invention also includes a method, wherein the above-described extrudable ink-receptive composition and a base layer are co-extruded and biaxially stretched before being applied onto a substrate to form multiple layers.

The present invention includes several advantages, not all of which are incorporated in a single embodiment. As mentioned above, extrusion of an image-receiving layer for an inkjet recording element is an economical method of manufacture, but compared to common coating techniques, it is difficult to achieve the desired properties of an image-receiving layer for use in inkjet recording. The present invention can achieve inkjet-recording properties that are improved compared to other inkjet image-receiving layer made by extrusion.

In another embodiment of the invention, a base layer between the ink-receiving layer and the support comprises a polyester material, preferably a polylactic-acid-based material. The inkjet recording element of the invention provides a fast ink dry time, good ozone fade performance, high image density, and robust manufacture.

Yet another aspect of the invention relates to an inkjet printing method comprising the steps of: A) providing an inkjet printer that is responsive to digital data signals; B) loading the inkjet printer with the inkjet recording element described above; C) loading the inkjet printer with an inkjet ink; and D) printing on the inkjet recording element using the inkjet ink in response to the digital data signals.

As used herein, the terms "over," "above," "under," and the like, with respect to layers in the inkjet media, refer to the order of the layers over the support, but do not necessarily indicate that the layers are immediately adjacent or that there are no intermediate layers.

The term "ink-permeable" is defined by the Applicants to mean that either the ink recording agent and/or the carrier for the recording agent is capable of being efficiently being transported into the microvoided layer during use.

DETAILED DESCRIPTION OF THE INVENTION

As noted above, the inkjet recording element of the present invention comprises, as an image-receiving layer, an extruded swellable open-celled absorbing layer that comprises a hydrophilic synthetic thermoplastic polymer.

Preferably, the at least one hydrophilic thermoplastic polymer is inherently capable of gaining greater than 30 w % by weight of water by absorption over 24 hours at 25° C.

The inventive image-receiving layer must effectively absorb both the water and humectants commonly found in printing inks as well as the recording agent (typically a dye-based colorant). Further ink-receiving layers, either above (overcoat) or below (inner layer or the base layer) are optional. The ink colorant or image-forming portion of the ink may form a gradient within the recording element and may be present, to at least some degree in more than one image-receiving layer.

As mentioned above, the one or more image-receiving layer is an ink-receiving layer that is intended to receive and contain most of the colorant, preferably more than 50% by weight of the applied colorant employing a typical inkjet dye-based composition.

The hydrophilic thermoplastic polymer in the image-receiving layer preferably has a $T_g$ that greater than 50° C., more preferably between 50° C. and 65° C. The at least one hydrophilic thermoplastic polymer in the image-receiving layer in total is present in an amount of at least 30%, preferably greater than 40 to 100%, more preferably 45 to 100% by weight of the polymer in the image-receiving layer. The volume percent voiding of the image-recording element is preferably 50 to 75, more preferably 60 to 70.

Preferred hydrophilic thermoplastic polymers for the image-receiving layer according to the present invention can comprise one or more of a variety of hydrophilic polymers including, for example, the polyester ionomer, polyether-polyamide copolymers, poly(vinyl alcohol) (PVA), polyvinyloxazoline, such as poly(2-ethyl-2-oxazoline) (PEOX), polyvinylmethyloxazoline, polyvinylmethyloxazoline, polyethers, poly(methacrylic acid), n-vinyl amide, thermoplastic urethane, polyether-polyamide copolymers, polyvinyl pyrrolidinone (PVP), and poly(vinyl alcohol) derivatives and copolymers, such as copolymers of poly(ethylene oxide) and poly(vinyl alcohol) (PEO-PVA) and copolymers of poly(ethylene vinyl alcohol) and poly(vinyl alcohol). Derivitized poly (vinyl alcohol) includes, but is not limited to, polymers having at least one hydroxyl group replaced by ether or ester groups, which may be used in the invention, for example an acetoacetylated poly(vinyl alcohol). Another copolymer of poly(vinyl alcohol), for example, is carboxylated PVA in which the an acid group is present in a comonomer. More than one polymer may be present in a layer.

The melt-extrudable polyvinyl alcohol compositions have a lower degree of crystallinity in their structures versus polyvinyl alcohol compositions that are not melt-extrudable. Polyvinyl alcohols which may be used according to the invention are all polyvinyl alcohols which are extrudable or which are made extrudable by the addition of appropriate additives such as plasticizers.

Preferred poly(vinyl alcohol) polymers and copolymers thereof has a degree of hydrolysis of at least about 50%, preferably at least about 75% and preferably less than 90%. Commercial embodiments of such poly(vinyl alcohol) and copolymers include EXCEVAL EVOH-co-PVOH from Kuraray Chemical (Japan), AQUASOL that is available in various grades from A. Schulman (Akron, Ohio) and ALCOTEX 864, available from Harlow Chemical Company, Ltd. (Harlow, Essex, UK). Melt-extrudable grade polyvinyl alcohol compositions are known in the art and are described in Famili et al., U.S. Pat. No. 5,369,168, Robeson et al., U.S. Pat. No. 5,349,000, Famili et al., U.S. Pat. No. 5,206,278, and Marten et al., U.S. Pat. No. 5,051,222, the disclosures of which are hereby incorporated by reference. The melt-extrudable polyvinyl alcohol compositions are about 75 to about 100 wt. % hydrolyzed, preferably 85-99 mol % hydrolyzed, and possess a degree of polymerization (DPn) in the range of about 200 to about 2500.

Suitable PVA copolymers may, for example, have a degree of polymerization of 200 to 2500. The melt flow index (MFI) of the polyvinyl alcohol resins to be used according to the invention may, for example, be 10 to 50 g/10 minutes, preferably 20 to 30 g/10 minutes.

The PVA derivatives and copolymers include chemically modified polyvinyl alcohols and polyvinyl alcohol copolymers. For example, a melt-extrudable polyvinyl alcohol copolymer containing 94 to 98 mol % vinyl alcohol and 2 to 6 mol % of a copolymerized monomer such as methyl methacrylate can be used. For example, a melt-extrudable chemically modified polyvinyl alcohol containing 1 to 30 wt. % of a polyhydric alcohol plasticizer such as glycerol or polyethylene glycol; a mineral acid such as phosphoric acid; and 0.05 to 1.0 wt. % of a dispersing agent such as glycerol monooleate can be used.

In a preferred embodiment of the invention, the hydrophilic thermoplastic polymer comprises a polyether group-containing and preferably a polyether amide block copolymer, wherein a block polymer with a number of polyether groups of 2 to 20 in each of the repeating copolymer segments provides especially good results.

Polyether amide block copolymers suitable according to the invention are, for example, those of the general formula

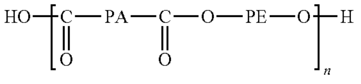

wherein PA is a polyamide segment and PE is a polyether segment. The individual segments can be connected to one another by carboxyl groups. A polyether segment can have 2 to 30, preferably 5 to 20 functional ether groups. A preferred copolymer of polyether and polyamide is PEBAX (commercially available from Atofina (USA), now known as the Arkema group).

Particularly preferred hydrophilic thermoplastic polymers for use in the invention comprises a polyether-polyamide copolymer such as, e.g., PEBAX or a PVOH-EVOH copolymer such as EXCEVAL. In another preferred embodiment, the hydrophilic thermoplastic polymer in the image-receiving layer is a blend of an ionic hydrophilic thermoplastic polymer and a non-ionic hydrophilic thermoplastic polymer in the weight ratio of 40:60 to 60:40. More particularly, the ionic hydrophilic thermoplastic polymer can be a polyester ionomer.

The "ionomers" or "polyester ionomers" used in the present invention contain at least one ionic moiety, which can also be referred to as an ionic group, functionality, or radical. In a preferred embodiment of this invention, the recurring units containing ionic groups are present in the polyester ionomer in an amount of from about 1 to about 12 mole percent, based on the total moles of recurring units. Such ionic moieties can be provided by either ionic diol recurring units and/or ionic dicarboxylic acid recurring units, but preferably by the latter. Such ionic moieties are anionic. Exemplary anionic ionic groups include carboxylic acid, sulfonic acid, and disulfonylimin and compatible combinations thereof and their salts and others known to a worker of ordinary skill in the art. Sulfonic acid ionic groups, or salts thereof, are preferred. Thus, the polyester ionomer may be a sulfonated polyester. In specific embodiments, the polyester ionomer may comprise monomeric units derived from a sulfonic-acid substituted aromatic dicarboxylic acid selected from the group consisting of 5-sodium sulfoisophthalic acid, 2-sodium sulfoisophthalic acid, 4-sodium sulfoisophthalic acid, 4-sodium sulfo-2,6-naphthalene dicarboxylic acid, an ester-forming derivative thereof, a compound in which each of these sodiums is substituted by another metal, and combinations thereof.

One type of ionic acid monomeric unit for the polyester ionomer has the following structure:

I

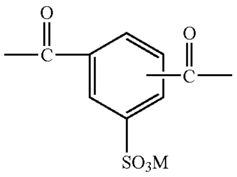

where M=H, Na, K or $NH_4$.

Ionic dicarboxylic acid recurring units can be derived, for example, from 5-sodiosulfobenzene-1,3-dicarboxylic acid (5-sodium sulfoisophthalic acid), 2-sodium sulfoisophthalic acid, 4-sodium sulfoisophthalic acid, 4-sodium sulfo-2,6-naphthalene dicarboxylic acid, or ester-forming derivatives, 5-sodiosulfocyclohexane-1,3-dicarboxylic acid, 5-(4-sodiosulfophenoxy)benzene-1,3-dicarboxylic acid, 5-(4-sodiosulfophenoxy)cyclohexane-1,3-dicarboxylic acid, similar compounds and functional equivalents thereof and others described in U.K. Patent Specification No. 1,470,059 (published Apr. 14, 1977). Other suitable polyester ionomers for use in the present invention are disclosed in U.S. Pat. Nos. 4,903,039 and 4,903,040, which are incorporated herein by reference.

Another type of aromatic dicarboxylic acid having a metal sulfonate group is shown below:

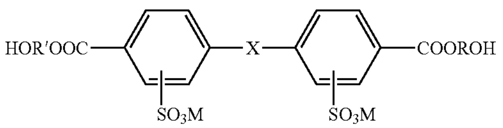

wherein X represents:

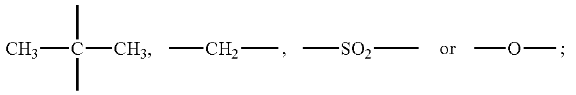

R and R' each represent $-(CH_2)_n-$ where n represents an integer of 1 to 20; and a compound in which each of these sodium atoms is substituted by another metal (e.g. potassium and lithium).

Another type of ionic dicarboxylic acid found useful in the practice of this invention has units represented by the formula:

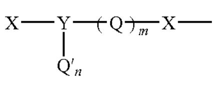

wherein each of m and n is 0 or 1 and the sum of m and n is 1; each X is carbonyl;

Q has the formula:

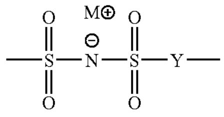

Q' has the formula:

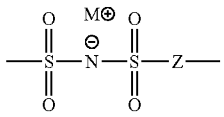

Y is a divalent aromatic radical, such as arylene (e.g. phenylene, naphthalene, xylylene, etc.) or arylidyne (e.g. phenenyl, naphthylidyne, etc.); Z is a monovalent aromatic radical, such as aryl, aralkyl or alkaryl (e.g. phenyl, p-methylphenyl, naphthyl, etc.), or alkyl having from 1 to 12 carbon atoms, such as methyl, ethyl, isopropyl, n-pentyl, neopentyl, 2-chlorohexyl, etc., and preferably from 1 to 6 carbon atoms; and M is a solubilizing cation and preferably a monovalent cation such as an alkali metal or ammonium cation.

Exemplary dicarboxylic acids and functional equivalents of this type from which such ionic recurring units are derived are 3,3'-[(sodioimino)disulfonyl]dibenzoic acid;

3,3'-[(potassioimino)disulfonyl]dibenzoic acid;

3,3'-[(lithioimino)disulfonyl]dibenzoic acid;

4,4'-[(lithioimino)disulfonyl]dibenzoic acid;

4,4'-[(sodioimino)disulfonyl]dibenzoic acid;

4,4'-[(potassioimino)disulfonyl]dibenzoic acid;

3,4'-[(lithioimino)disulfonyl]dibenzoic acid;

3,4'-[(sodioimino)disulfonyl]dibenzoic acid;

5-[4-chloronaphth-1-ylsulfonyl(sodioimino)sulfonyl]isophthalic acid;

4,4'-[(potassioimino)disulfonyl]dinaphthoic acid;

5-[p-tolylsulfonyl(potassioimino)sulfonyl]isophthalic acid;

4-[p-tolylsulfonyl(sodioimino)sulfonyl]-1,5-naphthalenedicarboxylic acid;

5-[n-hexylsulfonyl(lithioimino)sulfonyl]isophthalic acid;

2-[phenylsulfonyl(potassioimino)sulfonyl]terephthalic acid; and functional equivalents thereof.

These and other dicarboxylic acids useful in forming preferred ionic recurring units are described in U.S. Pat. No. 3,546,180 (issued Dec. 8, 1970 to Caldwell et al.) the disclosure of which is incorporated herein by reference.

A preferred monomeric unit of this type has the following structure:

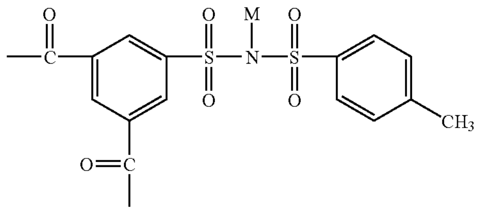

wherein M is as defined above.

It is also possible to have combinations of different ionic groups in the same recurring unit of a polyester ionomer, for example, as shown in U.S. Pat. No. 5,534,478 (the last structure in column 3).

One preferred class of substantially amorphous polyester ionomers employable in the present invention comprises the polymeric reaction product of: a first dicarboxylic acid; a second dicarboxylic acid comprising an aromatic nucleus to which is attached sulphonic acid group; an aliphatic first diol compound, and an aliphatic cycloaliphatic second diol compound. The second dicarboxylic acid comprises from about 2 to 25 mol percent of the total moles of first and second dicarboxylic acids. The second diol comprises from about 0 to 50 mol percent of the total moles of the first and second diol.

The first dicarboxylic acid or its anhydride, diester, or diacid halide functional equivalent may be represented by the formula: $-CO-R_1-CO-$ where $R_1$ is a saturated or unsaturated divalent hydrocarbon, an aromatic or aliphatic group or contains both aromatic and aliphatic groups. Examples of such acids include isophthalic acid, 5-t-butylisophthalic acid, 1,1,3-trimethyl-3-4-(4-carboxylphenyl)-5-indancarboxylic acid, terephthalic acid, 2,6-naphthalenedicarboxylic acid, or mixtures thereof. The first acid may also be an aliphatic diacid where $R_1$ is a cyclohexyl unit or 2-12 repeat units of a methylene group, such as succinic acid, adipic acid, glutaric acid and others. The first dicarboxylic acid is preferably an aromatic acid or a functional equivalent thereof, most preferably, isophthalic acid.

The second dicarboxylic acid may be a water-dispersible aromatic acid containing an ionic moiety that is a sulfonic acid group or its metal or ammonium salt as described earlier. Examples include the sodium, lithium, potassium or ammonium salts of sulfoterephthalic acid, sulfonaphthalenedicarboxylic acid, sulfophthalic acid, sulfoisophthalic acid, and 5-(4-sulfophenoxy) isophthalic acid, or their functionally equivalent anhydrides, diesters, or diacid halides. Most preferably, the second dicarboxylic acid comprises a soluble salt of 5-sulfoisophthalic acid or dimethyl 5-sulfoisophthalate. The ionic dicarboxylic acid repeating units of the polyester ionomers employed in accordance with the invention comprise from about 1 to about 25 mol percent, preferably about 10 to 25 mole percent of the total moles of dicarboxylic acids.

The dicarboxylic acid recurring units are linked in a polyester by recurring units derived from difunctional compounds capable of condensing with a dicarboxylic acid or a functional equivalent thereof. Suitable diols are represented by the formula: HO—$R_2$—OH, where $R_2$ is aliphatic, cycloaliphatic, or aralkyl. Examples of useful diol compounds include the following: ethylene glycol, diethylene glycol, propylene glycol, 1,2-cyclohexanedimethanol, 1,2-propanediol, 4,4'-isopropylidene-bisphenoxydiethanol, 4,4'-indanylidene-bisphenoxydiethanol, 4,4'-fluorenylidene-bisphenoxydiethanol, 1,4-cyclohexanedimethanol, 2,2'-dimethyl-1,3-propanediol, p-xylylenediol, and glycols having the general structure $H(OCH_2CH_2)_n$—OH or $H(CH_2)_n$ OH, where n=2 to 10. Diethyleneglycol, 1,4-cyclohexanedimethanol, pentanediol, and mixtures thereof are especially preferred.

The polyester ionomers used in this invention have a glass transition temperature ($T_g$) of about 80° C. or less and, preferably, from about 25° C. to 70° C. $T_g$ values can be determined by techniques such as differential scanning calorimetry or differential thermal analysis, as disclosed in N. F. Mott and E. A. Davis, *Electronic Processes in Non-Crystalline Material*, Oxford University Press, Belfast, 1971, at p. 192. Preferred polyester ionomers for use in the present invention include the EASTEK polymers previously known as EASTMAN AQ polymers manufactured by Eastman Chemical Company of Kingsport, Tenn. With reference to the preferred polyester ionomer material for the image-receiving layer, monomeric units derived from 1,4-cyclohexane dimethanol (CHDM) are also referred to as "CHDM repeat units" or "CHDM comonomer units."

The ionomer polymers of this invention are relatively high molecular weight (Mn preferably above 10,000, more preferably above about 14,000) substantially amorphous polyesters that disperse directly in water without the assistance of organic co-solvents, surfactants, or amines. As indicated above, this water dispersibility is attributable in large part to the presence of ionic substituents, for example, sulfonic acid moieties or salts thereof, for example, sodiosulfo moieties ($SO_3Na$) in the polymer. Properties of these polymers can be found at their website and are described in Publication No. GN-389B of Eastman Chemical Company, dated May 1990, the disclosures of both of which are incorporated herein by reference. Especially preferred is poly[1,4-cyclohexylene-dimethylene-co-2,2'-oxydiethylene (46/54) isophthalate-co-5-sodiosulfo-1,3-benzenedicarboxylate (82/18)] (obtained as Eastek® 1100, previously sold as EASTMAN AQ 55 polymer, $T_g$ 55° C. from Eastman Chemical Co.).

The commercially available salt forms of the polyester ionomer, including the aforementioned EASTEK polymers, have been shown to be effective in the present invention.

Without wishing to be bound by theory, the presence of the polyester ionomer in the image-receiving layer is believed to help make the voided pores of the structure more wettable or hydrophilic, thus tending to draw the ink fluids through faster and improving drytime. The presence of the polyester ionomer in the image-receiving layer also improves ozone fade performance. For best results, the polyester ionomer should be mixed in the melt for the layer at 5 to 40% by weight, preferably 10 to 30% by weight, and optimally 15 to 20% by weight.

In an embodiment, the hydrophilic thermoplastic polymer comprises a hydrophilic blend of an ionic hydrophilic thermoplastic polymer, such as a polyester ionomer, and a nonionic hydrophilic thermoplastic polymer, such as a polyether group-containing thermoplastic copolymer. In a particularly preferred embodiment, the hydrophilic thermoplastic polymer is selected from a hydrophilic blend of a polyester ionomer such as AQ55 and a polyether amide block copolymer such as PEBAX 1657 which can be compounded with various levels of an organic voiding agent such as crosslinked PMMA (polymethylmethacrylate) beads or an inorganic voiding agent such as $BaSO_4$.

The layer thickness of the image-receiving layer is from 10 to 200 μm, preferably from 20 to 80 μm.

Voids in the image-receiving layer may be obtained by using void initiators in the required amount during its fabrication. Such void initiators may be inorganic fillers, as described above, or polymerizable organic materials. The particle size of void initiators is preferably in the range of from about 0.1 to about 15 μm, more preferably from about 0.3 to about 5 μm, for best formation of an ink porous but smooth surface. The void initiators may be employed in an amount of 30-50% by volume in the feed stock for the image-receiving layer prior to extrusion and microvoiding.

Although organic microbeads as well as inorganics can be used as void initiators. Typical polymeric organic materials for the microbeads include polystyrenes, polyamides, fluoro polymers, poly(methyl methacrylate), poly(butyl acrylate), polycarbonates, or polyolefins. The voiding agent particles preferably are inorganic and have an average particle size of from about 0.1 to about 15 μm, more preferably 0.3 to 2.0 μm, and make up from about 45 to about 75 weight %, preferably in an amount between 50 to 70 weight percent of the total weight of the microvoided layer. In another embodiment, the particles are organic and have an average particle size of from about 0.3 to about 2 μm and comprise from about 35 to about 55 weight % of the total weight of the microvoided layer.

The inorganic particles can be selected, for example, from the group consisting of barium sulfate, calcium carbonate, zinc sulfide, zinc oxide, titanium dioxide, silica, alumina, and combinations thereof.

In one embodiment, in which the composition is extruded, the composition of the image-receiving layer is thermally stable at 150° C., preferably 200° C. Preferably the single or, in the case of a blend, the principle hydrophilic polymers (the major amount in terms of weight percent) are thermally stable at 150° C., preferably 200° C., more preferably 250° C.

The void initiators are mixed with the hydrophilic polymer or blend of polymers using any one of various known polymer melt mixing processes. Typically a twin-screw extruder is utilized. Typically the hydrophilic polymer or blend of polymers are fed into the initial feed throat of a twin-screw extruder, and the void initiators are fed in a separate feed throat, although all materials can alternatively be fed into the first feed throat. The mixing screws are rotated at an RPM level which achieves uniform mixing of the void initiators yet is not so high as to significantly change the properties of the polymers used.

Additives which improve the extrusion properties of the hydrophilic thermoplastic polymer are, for example, plasticizers. A plasticizer may be incorporated into the polymer matrix during the preparation of the polyvinyl alcohol or may simply be added to the twin-screw extruder, or other mixing process, and mixed therein with the hydrophilic thermoplastic polymer. Suitable plasticizers that are compatible with the hydrophilic thermoplastic polymer are, for example, polyhydric alcohols, such as glycerol, polyethylene glycol, ethylene glycol, diethylene glycol and mannitol. The plasticizer or a plasticizer mixture containing several plasticizers may amount to 1 to 30 wt %, preferably 5 to 20 wt %, based on the weight of the polymer and additive mix.

The extrusion is performed according to methods which are known to the skilled worker in the biaxially oriented film manufacturing industry. The extruder is, for example, a screw extruder. According to a preferred embodiment of the invention, the temperature in the extruder or the temperature in different sections of the extruder is adjusted to 140 to 250° C., in particular 180 to 220° C.

The cast pre-stretched layer thickness of the extruded image-receiving layer according to the present invention is preferably from 50 to 1000 μm, more preferably 100 to 400 μm. In a preferred embodiment, the cast sheet is typically stretched at 70 to 75° C., first in the machine direction at a ratio of 2 to 5 times, and then at 70 to 75° C. in the transverse direction at a ratio of 2 to 5 times. The final stretched thickness of the extruded imaging layer is preferably from 10 to 200 μm, more preferably 20 to 80 μm. In the case of an optional base layer, the final stretched layer thickness of the base layer is preferably from 10 to 200 μm, more preferably 25 to 50 μm.

Referring again to the image-receiving layer of the present invention, dye mordants can be added to the image-receiving layer in order to improve smear resistance at high relative humidity, or inner hydrophilic absorbing layers. Mordants conventionally include "cationic polymeric mordant" which are typically polymers comprising the reaction product of a cationic monomer (mordant moiety) which monomer comprises free amines, protonated free amines, and quaternary ammonium, as well as other cationic groups such as phosphonium. In the extruded layer, however, inorganic mordants are preferred because they are more thermally stable. Most preferably, the void initiating particles used in the image-receiving layer can also function as an inorganic mordant, that is, have a positively charged surface. Fumed alumina is an example of such dual functional particles.

The amount of mordant used, especially in the image-receiving layer, should be high enough so that the images printed on the recording element will have a sufficiently high density. In a preferred embodiment of the invention, the mordants, preferably having a cationic charged surface, are used in the amount of about 5 to 30 weight percent solids, preferably 10 to 20 weight percent in the image-receiving layer, based on total weight of the dried coating.

As mentioned above, the melt-extrudable composition used in the present invention may contain various particulate (i.e., pigments) and other additives. Particulates may be used to provide the medium with anti-blocking properties to prevent ink from transferring from one medium to an adjacent medium during imaging of the media. Further additives, such as white pigments, color pigments, fillers, especially absorptive fillers and pigments such as oxides, carbonates, silicates or sulfates of alkali metals, earth alkali metals such as silicic acid, aluminum oxide, barium sulfate, calcium carbonate and magnesium silicate. alumina, aluminum hydroxide, pseudoboehmite. Further additives such as color fixation agents, dispersing agents, softeners and optical brighteners can be contained in the polymer layer. Titanium dioxide can be used as a white pigment. Further fillers and pigments are calcium carbonate, magnesium carbonate, clay, zinc oxide, aluminum silicate, magnesium silicate, ultramarine, cobalt blue, and carbon black or mixtures of these materials. The fillers and/or pigments are used in quantities of 0 to 40 wt. %, especially 1 to 20 wt. %. The quantities given are based on the mass of the polymer layer.

Further examples of inorganic and organic particulate include zinc oxide, tin oxide, silica-magnesia, bentonite, hectorite, poly(methyl methacrylate), and poly(tetrafluoroethylene). In order not to impair the gloss of the recording material, the pigment used within the ink-absorbing layer may be a finely divided inorganic pigment with a particle size of 0.01 to 1.0 μm, especially 0.02 to 0.5 μm. Especially preferred, however, is a particle size of 0.1 to 0.3 μm. Especially well suited are silicic acid and aluminum oxide with an average particle size of less than 0.3 μm. However, a mixture of silicic acid and aluminum oxide with an average particle size of less than 0.3 μm can also be employed.

Matte particles may be added to any or all of the layers described in order to provide enhanced printer transport, resistance to ink offset, or to change the appearance of the image-receiving layer to satin or matte finish.

Typical additives can also include antioxidants, process stabilizers, UV absorbents, UV stabilizers, antistatic agents, anti-blocking agents, slip agents, colorants, foaming agents, plasticizers, optical brightening agents, flow agents, and the like. Anti-oxidants are particularly effective in preventing the melt-extrudable composition from discoloring.

While not necessary, the hydrophilic layers described above may also include a cross-linker. Such an additive can improve the adhesion of a layer to the substrate as well as contribute to the cohesive strength and water resistance of the layer. Cross-linkers such as carbodiimides, polyfunctional aziridines, melamine formaldehydes, isocyanates, epoxides, and the like may be used. If a cross-linker is added, care must be taken that excessive amounts are not used as this will decrease the swellability of the layer, reducing the drying rate of the printed areas.

In a further embodiment of the invention the recording material can have one or more additional layers. For example, in one embodiment, the extruded image-receiving layer can be provided over a base layer. This additional base layer can have the function of a carrier-fluid absorbing layer. This base layer can be extruded. The base layer can be applied in the form of a single layer or multiple layers. It can contain hydrophilic or water-soluble binders, dye-fixation agents, dyes, optical brighteners, curing agents as well as inorganic and/or organic pigments.

In a preferred embodiment of the invention, the inkjet recording element further comprises a coextruded base layer between the image-receiving layer and the support which base layer comprises a voided or non-voided polyester polymer. Preferably, the $T_g$ of the polyester is not more than 75° C., more preferably between 55° C. and 70° C. Preferably, the hydrophilic thermoplastic polymer in the image-receiving layer has a $T_g$ that is within 15° C. of the $T_g$ of the polyester in the base layer.

In a preferred embodiment, the polyester in the base layer is a polylactic-acid-based material and the inkjet image-receiving layer and base layer together comprise a coextruded and a biaxially stretched composite material.

Also, additional image-receiving layers can be formed using conventional coating, for example, an overcoat or a further ink-receiving layer. With respect to additional optional non-extruded ink-receiving layers, coating compositions employed in the invention may be applied by any number of well known techniques, including dip-coating, wound-wire rod coating, doctor blade coating, gravure and reverse-roll coating, slide coating, bead coating, extrusion coating, curtain coating and the like. Known coating and drying methods are described in further detail in Research Disclosure no. 308119, published December 1989, pages 1007 to 1008. Slide coating is preferred, in which the base layers and overcoat may be simultaneously applied. After coating, the layers are generally dried by simple evaporation, which may be accelerated by known techniques such as convection heating.

In another embodiment of the invention, a filled layer containing light-scattering particles such as titania may be situated between a clear support material and the ink-receiving or hydrophilic absorbing layers described herein. Such a combination may be effectively used as a backlit material for signage applications. Yet another embodiment which yields an ink receiver with appropriate properties for backlit display applications results from selection of a partially voided or filled poly(ethylene terephthalate) film as a support material, in which the voids or fillers in the support material supply sufficient light scattering to diffuse light sources situated behind the image.

As noted above, in a preferred embodiment of the invention, the ink-recording element in the invention contains a base layer comprising polyester, preferably a polylactic acid-based material (also referred to herein as a polylactic-acid-containing layer). The polylactic-acid-based material comprises a polylactic-acid-based polymer including polylactic acid or copolymers thereof comprising compatible comonomers such as one or more hydroxycarboxylic acids. Exemplary hydroxycarboxylic acid includes glycolic acid, hydroxybutyric acid, hydroxyvaleric acid, hydroxypentanoic acid, hydroxycaproic acid and hydroxyheptanoic acid. The polylactic-acid-based material comprises 85 to 100% by weight of a polylactic-acid-based polymer (or PLA-based polymer). The PLA-based polymer preferably comprises from 85 to 100 mol % of lactic-acid units (preferably derived from L-lactic acid) and optionally polymerization compatible other comonomers. Preferably, the PLA-based polymer comprises at least 85 mole percent, more preferably at least 90 mole percent, most preferably at least 95 mole percent of lactic-acid monomeric units whether derived from lactic acid monomers or lactide dimers.

Polylactic acid, also referred to as "PLA," used in this invention includes polymers based essentially on single D- or L-isomers of lactic acid, or mixtures thereof. In a preferred embodiment, PLA is thermoplastic polyester having 2-hydroxy lactate (lactic acid) or lactide units. The formula of the unit is: $—[O—CH(CH_3)—CO]—$. The alpha-carbon of the monomer is optically active (L-configuration). The polylactic-acid-based polymer is typically selected from the group consisting of D-polylactic acid, L-polylactic acid, D,L-polylactic acid, meso-polylactic acid, and any combination of D-polylactic acid, L-polylactic acid, D,L-polylactic acid and meso-polylactic acid. In one embodiment, the polylactic acid-based material includes predominantly PLLA (poly-L-lactic acid). In one embodiment, the number average molecular weight is between about 15,000 and about 1,000,000.

The various physical and mechanical properties vary with change of racemic content, and as the racemic content increases, the PLA becomes amorphous, as described, for example, in U.S. Pat. No. 6,469,133, the contents of which are hereby incorporated by reference. In one embodiment, the polymeric material includes relatively low (less than about 5%) amounts of the racemic form of the polylactic acid. When the PLA content rises above about 5% of the racemic form, the amorphous nature of the racemic form may alter the physical and/or mechanical properties of the resulting material.

Additional polymers can be added to the polylactic-acid-based material so long as they are compatible with the polylactic-acid-based polymers. In one embodiment, compatibility is miscibility (defined as one polymer being able to blend with another polymer without a phase separation between the polymers) such that the polymer and the polylactic-acid-based polymer are miscible under conditions of use. Typically, polymers with some degree of polar character can be used. Suitable polymeric resins that are miscible with polylactic acid to some extent can include, for example, polyvinyl chloride, polyethylene glycol, polyglycolide, ethylene vinyl acetate, polycarbonate, polycaprolactone, polyhydroxyalkanoates (polyesters), polyolefins modified with polar groups such as maleic anhydride and others, ionomers, e.g. SURLYN (DuPont Company), epoxidized natural rubber and other epoxidized polymers.

In one particular embodiment, a polylactic acid comprises a mixture of at least 90%, preferably about 96% poly(L-lactic acid), and preferably about 4% poly(D-lactic acid), which is preferable from the viewpoint processing durability.

To the polylactic-acid-based material, various kinds of known additives, for example, an oxidation inhibitor, or an antistatic agent may be added by a volume which does not destroy the advantages according to the present invention. As mentioned above, the polylactic-acid-containing layer can have up to 15 weight percent of additional polymers or blends of other polyesters in the continuous phase. Optionally, chain extenders can be used for the polymerization, as will be understood by the skilled artisan. Chain extenders include, for example, higher alcohols such as lauryl alcohol and hydroxy acids such as lactic acid and glycolic acid.

The polylactic-acid-containing layer can comprise a film or sheet of one or more thermoplastic polylactic-acid-based polymers (including polymers comprising individual isomers or mixtures of isomers), which film has been biaxially stretched (that is, stretched in both the longitudinal and transverse directions). Any suitable polylactic acid or polylactide can be used as long as it can be cast, spun, molded, or otherwise formed into a film or sheet, and can be biaxially oriented as noted above. Generally, the polylactic acids have a glass transition temperature of from about 55 to about 65° C. (preferably from about 58 to about 64° C.) as determined using a differential scanning calorimeter (DSC).

Suitable polylactic-based polymers can be prepared by polymerization of lactic acid or lactide and comprise at least 50% by weight of lactic acid residue repeating units (including lactide residue repeating units), or combinations thereof. These lactic acid and lactide polymers include homopolymers and copolymers such as random and/or block copolymers of lactic acid and/or lactide. The lactic acid residue repeating monomer units may be obtained from L-lactic acid, D-lactic acid, by first forming L-lactide, D-lactide or LD-lactide, preferably with L-lactic acid isomer levels up to 75%. Examples of commercially available polylactic acid polymers include a variety of polylactic acids that are available from Chronopol Inc. (Golden, Colo.), or polylactides sold under the trade name ECOPLA. Further examples of suitable commercially available polylactic acid are NATUREWORKS from Cargill Dow, LACEA from Mitsui Chemical, or L5000 from Biomer. When using polylactic acid, it may be desirable to have the polylactic acid in the semi-crystalline form.

Polylactic acids may be synthesized by conventionally known methods such as a direct dehydration condensation or lactic acid or a ring-opening polymerization of a cyclic dimer (lactide) of lactic acid in the presence of a catalyst. However, polylactic acid preparation is not limited to these processes. Copolymerization may also be carried out in the above processes by addition of a small amount of glycerol and other polyhydric alcohols, butanetetracarboxylic acid and other aliphatic polybasic acids, or polysaccharide and other polyhydric alcohols. Further, molecular weight of polylactic acid may be increased by addition of a chain extender such as diisocyanate. Compositions for polylactic-acid-based polymers are also disclosed in U.S. Pat. No. 5,405,887, hereby incorporated by reference.

The polylactic-acid-containing base layer can be voided or non-voided. Interconnecting microvoids can be produced in the base layer by the use of void initiators in the form of particles. The size of the void initiating particles which initiate the voids upon stretching should have an average particle size of 5 nm to 15 to μm, usually 0.1 to 10.0, most usually 0.3 to 2.0, and desirably 0.5 to 1.5 μm. Average particle size is that as measured by a SEDIGRAPH 5100 Particle Size Analysis System (by PsS, Limited). Preferred void initiating particles are inorganic particles, including but not limited to, barium sulfate, calcium carbonate, zinc sulfide, titanium dioxide, silica, alumina, and mixtures thereof, etc. Barium sulfate, zinc sulfide, or titanium dioxide is especially preferred.

In still another embodiment, the base layer can comprise two layers, a polylactic acid-containing microvoided layer and a second voided or unvoided polylactic-acid-containing layer that is adjacent to said polylactic acid-containing microvoided layer. The two layers may be integrally formed using a co-extrusion or extrusion coating process. The polylactic acid of the second voided layer can be any of the polylactic acids described previously for the inorganic particle voided layer.

It is possible for the voids of this second voided layer or the microvoided layer to be formed by, instead of particles, by finely dispersing a polymer incompatible with the matrix polylactic-acid-based material and stretching the film uniaxially or biaxially. (It is also possible to have mixtures of particles and incompatible polymers.) When the film is stretched, a void is formed around each particle of the incompatible polymer. Since the formed fine voids operate to diffuse a light, the film is whitened and a higher reflectance can be obtained. The incompatible polymer is a polymer that does not dissolve into the polylactic acid. Examples of such an incompatible polymer include poly-3-methylbutene-1, poly-4-methylpentene-1, polypropylene, polyvinyl-t-butane, 1,4-transpoly-2,3-dimethylbutadiene, polyvinylcyclohexane, polystyrene, polyfluorostyrene, cellulose acetate, cellulose propionate and polychlorotrifluoroethylene. Among these polymers, polyolefins such as polypropylene are suitable.

In still another embodiment, paper is laminated to the other side of the polylactic acid-containing layer which does not have thereon the image-receiving layer. In this embodiment, the polylactic-acid-containing layer may be thin, as the paper would provide sufficient stiffness.

In another embodiment of the invention, the substrate also contains a lower permeable layer adjacent to the polylactic acid-containing layer on the opposite side from the ink-permeable porous polyester layer.

The substrate used in this invention has rapid absorption of ink, as well as high absorbent capacity, which allows rapid printing and a short dry time. A short dry time is advantageous, as the prints are less likely to smudge and have higher image quality as the inks do not coalesce prior to drying.

In a preferred embodiment, the one or more polylactic-acid-containing layers have levels of voiding, thickness, and/or smoothness adjusted to provide optimum ink absorbency and properties. A microvoided polylactic-acid-containing layer can contain voids to efficiently absorb the printed inks commonly applied to ink-jet imaging supports without the need of multiple processing steps and multiple coated layers. The polylactic acid-containing layer can also provide stiffness to the media and physical integrity to other layers. An ink-permeable microvoided polylactic-acid-containing layer containing voids that are interconnected or open-celled in structure enhances the ink absorption rate by enabling capillary action to occur.

The extruded layer or co-extruded layers used in this invention may be made on readily available film formation machines such as employed with conventional polyester materials. A one step formation process leads to low manufacturing cost.

The process for adding the inorganic particle or other void initiator to the layer composition is not particularly restricted. The particles can be added in an extrusion process utilizing a twin-screw extruder.

A process for producing a preferred embodiment of the film according to the present invention will now be explained. However, the process is not particularly restricted to the following one.

Inorganic particles can be mixed into the layer composition in a twin-screw extruder at a temperature of 170-220° C. This mixture is extruded through a strand die, cooled in a water bath or on a chilled metal band, and pelletized. The pellets are then dried at 50° C. and fed into an extruder "A".

The molten sheet delivered from the die is cooled and solidified on a drum having a temperature of 40° C. to 60° C. while applying either an electrostatic charge or a vacuum. The sheet is stretched in the longitudinal direction at a draw ratio of 2-5 times during passage through a heating chamber at a temperature of 70° C. to 80° C. Thereafter, the film is introduced into a tenter while the edges of the film are clamped by clips. In the tenter, the film is stretched in the transverse direction in a heated atmosphere having a temperature of 70 to 80° C. Although both the draw ratios in the longitudinal and transverse directions are in the range of 2 to 5 times, the area ratio between the non-stretched sheet and the biaxially stretched film is preferably in the range of 7 to 16 times. If the area ratio is greater than 16 times, breakage of the film is liable to occur. Thereafter, the film is uniformly and gradually cooled to a room temperature, and wound. A modification of the above stretching method is where both the longitudinal and transverse stretch occurs simultaneously as in a SIMUL-STRETCHER machine (sold by Bruckner).

Inorganic particles can be incorporated into the extruded layer as described below. These particles can comprise from about 45 to about 75 weight % (preferably from about 50 to about 70 weight %) of the total layer.

These inorganic particles are at least partially bordered by voids because they are embedded in the microvoids distributed throughout a continuous first phase comprising the hydrophilic thermoplastic polymer. Thus, the microvoids containing the inorganic particles comprise a second phase dispersed within the continuous hydrophilic first phase. The microvoids generally occupy from about 50 to about 75% (by volume) of the microvoided layer.

The microvoids can be of any particular shape, that is circular, elliptical, convex, or any other shape reflecting the film orientation process and the shape and size of the inorganic particles. The size and ultimate physical properties of the microvoids depend upon the degree and balance of the orientation, temperature and rate of stretching, crystallization characteristics of the polylactic acid, the size and distribution of the inorganic particles, and other considerations that would be apparent to one skilled in the art. Generally, the microvoids are formed when the extruded sheet containing inorganic particles is biaxially stretched using conventional orientation techniques.

Thus, one embodiment of a method of making an inkjet recording element according to the present invention comprises:

(a) blending inorganic particles into a melt comprising at least one hydrophilic thermoplastic polymer, in a continuous phase, and inorganic and/or organic void initiating particles;

(b) forming a sheet comprising a layer of the melt by extrusion;

(c) stretching the sheet biaxially to form interconnected microvoids around the inorganic or organic particles to form an image-receiving layer comprising at least one hydrophilic thermoplastic polymer, in a continuous phase, and interconnecting voids, which voids contain the inorganic and/or organic void initiating particles; and (d) applying the biaxially stretched sheet over a support.

In one embodiment, the image-receiving layer is extruded as a monolayer film and stretched at a temperature of 75° C. In another method, the image-receiving layer containing inorganic or organic particles is co-extruded with at least one other layer to form a multilayer film, which other layer comprises a voided or non-voided polyester material adjacent to and integral with the image-receiving layer. In a preferred embodiment the polyester has a $T_g$ under 75° C. and, more particularly, is a polylactic-acid-based material. The composite sheet can be stretched in both directions simultaneously or the sheet can be sequentially stretched in a machine direction first followed by a transverse direction.

Preferably, the monolayer or coextruded composite film is stretched at a temperature of under 80° C., more preferably under 75° C.

As noted above, the porous image-receiving layer that could be utilized in the invention contains interconnecting voids. These voids provide a pathway for an ink to penetrate appreciably into the substrate, thus allowing the substrate to contribute to the dry time. A non-porous image-receiving layer or a porous image-receiving layer that contains closed cells will not allow the substrate to contribute to the dry time.

The support for the inkjet recording element used in the invention can be any of those usually used for inkjet receivers, such as resin-coated paper, paper, polyesters, or microporous materials such as polyethylene polymer-containing material sold by PPG Industries, Inc., Pittsburgh, Pa. under the trade name of TESLIN, TYVEK synthetic paper (DuPont Corp.), and OPPALYTE films (Mobil Chemical Co.) and other composite films listed in U.S. Pat. No. 5,244,861. Opaque supports include plain paper, coated paper, synthetic paper, photographic paper support, melt-extrusion-coated paper, and laminated paper, such as biaxially oriented support laminates. Biaxially oriented support laminates are described in U.S. Pat. Nos. 5,853,965; 5,866,282; 5,874,205; 5,888,643; 5,888,681; 5,888,683; and 5,888,714. These biaxially oriented supports include a paper base and a biaxially oriented polyolefin sheet, typically polypropylene, laminated to one or both sides of the paper base. Transparent supports include glass, cellulose derivatives, e.g., a cellulose ester, cellulose triacetate, cellulose diacetate, cellulose acetate propionate, cellulose acetate butyrate; polyesters, such as poly(ethylene terephthalate), poly(ethylene naphthalate), poly(1,4-cyclohexanedimethylene terephthalate), poly(butylene terephthalate), and copolymers thereof; polyimides; polyamides; polycarbonates; polystyrene; polyolefins, such as polyethylene or polypropylene; polysulfones; polyacrylates; polyetherimides; and mixtures thereof. The papers listed above include a broad range of papers, from high end papers, such as photographic paper to low end papers, such as newsprint. In a preferred embodiment, polyethylene-coated or poly(ethylene terephthalate) paper is employed.

In principal, any raw paper can be used as support material. Preferably, surface sized, calendared or non-calendared or heavily sized raw paper products are used. The paper can be sized to be acidic or neutral. The raw paper should have a high dimensional stability and should be able to absorb the liquid contained in the ink without curl formation. Paper products with high dimensional stability of cellulose mixtures of coniferous cellulose and eucalyptus cellulose are especially suitable. Reference is made in this context to the disclosure of DE 196 02 793 B1 which describes a raw paper as an ink-jet recording material. The raw paper can have further additives conventionally used in the paper industry and additives such as dyes, optical brighteners or defoaming agents. Also, the use of waste cellulose and recycled paper is possible. However, it is also possible to use paper coated on one side or both sides with polyolefins, especially with polyethylene, as a support material.

The support used in the invention may have a thickness of from 50 to 500 μm, preferably from 75 to 300 μm. Antioxidants, antistatic agents, plasticizers and other known additives may be incorporated into the support, if desired.

In order to improve the adhesion of the tie layer or, in the absence of a tie layer, the ink-receiving layer, to the support, the surface of the support may be subjected to a corona-discharge treatment prior to applying a subsequent layer. The adhesion of the ink-recording layer to the support may also be improved by coating a subbing layer or glue on the support. Examples of materials useful in a subbing layer include halogenated phenols and partially hydrolyzed vinyl chloride-co-vinyl acetate polymer.

Optionally, an additional backing layer or coating may be applied to the backside of a support (i.e., the side of the support opposite the side on which the image-recording layers are coated) for the purposes of improving the machine-handling properties and curl of the recording element, controlling the friction and resistivity thereof, and the like.

Typically, the backing layer may comprise a binder and a filler. Typical fillers include amorphous and crystalline silicas, poly(methyl methacrylate), hollow sphere polystyrene beads, micro-crystalline cellulose, zinc oxide, talc, and the like. The filler loaded in the backing layer is generally less than 5 percent by weight of the binder component and the average particle size of the filler material is in the range of 5 to 30 μm. Typical binders used in the backing layer are polymers such as polyacrylates, gelatin, polymethacrylates, polystyrenes, polyacrylamides, vinyl chloride-vinyl acetate copolymers, poly(vinyl alcohol), cellulose derivatives, and the like. Additionally, an antistatic agent also can be included in the backing layer to prevent static hindrance of the recording element. Particularly suitable antistatic agents are compounds such as dodecylbenzenesulfonate sodium salt, octylsulfonate potassium salt, oligostyrenesulfonate sodium salt, laurylsulfosuccinate sodium salt, and the like. The antistatic agent may be added to the binder composition in an amount of 0.1 to 15 percent by weight, based on the weight of the binder. An image-recording layer may also be coated on the backside, if desired.

Conventional hot-melt extrusion coating techniques may be used in accordance with this invention to laminate the ink-receiving layer to a support. In such processes, a tie layer resin is first subjected to heat and pressure inside the barrel of an extruder. Then, the molten resin is forced by an extruder screw through a narrow slit of an extrusion coating die. At the exit of the die slit, a molten curtain emerges. This molten curtain is drawn down from the die into a nip between two counter-rotating rolls, a chill roll, and pressure roll. While coming into contact with the faster moving support substrate on the pressure roll, hot resin is drawn out to the desired thickness on the support substrate.

The ink-receiving layer or substrate is also fed into the nip such that the tie layer resin is between the support and the ink receiving substrate. Thus, the two substrates and tie layer can be passed between a chill roll and pressure roll to ensure complete contact and adhesion. The combination of the extruder screw speed and web line speed determines the thickness of the tie layer.

In a co-extrusion system, different types of molten resins from two or more extruders combine in a co-extrusion feed block to form a multi-layered tie layer structure. This multi-layered "sandwich" is then introduced into the die and will flow across the full width of the die. With co-extrusion, a multi-layered tie layer can be produced in a single pass of the substrates.

A hot-melt extrudable composition for the tie layer can comprise, for example, one or more suitable polymers such as polyolefin, polyurethane, ethylene-acrylic acid copolymer, ethylene-methacrylic acid copolymer, ethylene-acrylic acid-methacrylate terpolymer, sodium-ethylene-acrylic acid, zinc-ethylene-acrylic acid, poly(2-ethyl-2-oxazoline), and copolymers and mixtures thereof. A non-voided polyolefin material is preferred.

An optional moisture barrier coating, can also be extruded onto a support using a melt extrudable composition. Suitable polymers for forming the moisture barrier coating can include, for example, homopolymers and copolymers of polyolefins, such as polyethylene and polypropylene; ethylene-acrylic acid copolymers; ethylene-acrylate copolymers; and polyesters. The moisture barrier coating may further comprise additives and particulate such as titanium dioxide, talc, calcium carbonate, silica, clay, and the like. Typically, the thickness of the moisture barrier layer is in the range of about 5 μm (0.2 mil) to about 100 μm (4 mil) and more preferably about 15 μm (0.6 mil) to about 50 μm (2 mil).

The inventive recording materials are characterized by having instant drying upon printing. They exhibit high wiping fastness while providing excellent color density and excellent mottle values. The recording material according to the invention has an improved ozone fade, particularly with respect to conventional open-cell instant dry inkjet media. Without wishing to be bound by theory, it is believed that the open-cells in the hydrophilic material in the image-receiving layer may collapse, at least to some extent, when ink is applied during inkjet printing, due to water in the ink composition dissolving the hydrophilic polymer. The collapsing of the open cells might also result from the swelling of the hydrophilic polymer phase. The collapsing of the open cells may not only be responsible for the improved image density, but may also provide a barrier to ozone relative to air, thereby reducing ozone fade.

Another aspect of the invention relates to an inkjet printing method comprising the steps of: A) providing an inkjet printer that is responsive to digital data signals; B) loading the inkjet printer with the inkjet recording element described above; C) loading the inkjet printer with an inkjet ink; and D) printing on the inkjet recording element using the inkjet ink in response to the digital data signals.

Inkjet inks used to image the recording elements of the present invention are well known in the art. The ink compositions used in inkjet printing typically are liquid compositions comprising a solvent or carrier liquid, dyes or pigments, humectants, organic solvents, detergents, thickeners, preservatives, and the like. The solvent or carrier liquid can be solely water or can be water mixed with other water-miscible solvents such as polyhydric alcohols. Inks in which organic materials such as polyhydric alcohols are the predominant carrier or solvent liquid may also be used. Particularly useful are mixed solvents of water and polyhydric alcohols. The dyes used in such compositions are typically water-soluble direct or acid type dyes. Such liquid compositions have been described extensively in the prior art including, for example, U.S. Pat. Nos. 4,381,946; 4,239,543; and 4,781,758.

The following examples are provided to further explain the invention.

EXAMPLES

Comparative Example 1

A two-layered Poly Lactic Acid (hereafter "PLA") cast film is prepared in the following manner. The materials used in the preparation are:

(1) a PLA resin (NATURE WORKS 2002-D by Cargill-Dow) for the base layer; and (2) a compounded mix consisting of 35% by weight of PLA resin (NATUREWORKS 2002-D by Cargill-Dow) and 65% by weight of barium sulfate (BLANC FIXE XR-HN from Sachtleben) with a mean particle size of 0.8 μm for the layer to be voided.

The barium sulfate was compounded with the PLA resin through mixing in a counter-rotating twin screw extruder attached to a pelletizing die. Then both resins were dried at 52° C. and fed by two plasticating screw extruders into a co-extrusion die manifold to produce a two-layered melt stream (200° C.) which was rapidly quenched on a chill roll after issuing from the die. By regulating the throughputs of the extruders, it was possible to adjust the thickness ratio of the layers in the cast laminate sheet. In this case, the thickness ratio of the two layers was adjusted at 1:1 with the thickness of both cast layers being approximately 450 μm. The cast sheet was then stretched at 75° C. first 3.3 times in the X-direction (corresponds to longitudinal direction) and then 3.3 times in the Y-direction (corresponds to the transverse direction). The stretched sheet final thickness was approximately 140 μm.

Example 1

A two-layered cast film is prepared in the following manner. The materials used in the preparation are:

(1) a PLA resin (NATUREWORKS 2002-D by Cargill-Dow) for the base layer; and (2) a compounded mix consisting of 32% by weight of a blend of two hydrophilic polymers and 68% by weight of Barium Sulfate (BLANC FIXE XR-HN from Sachtleben) with a mean particle size of 0.8 μm for the layer to be voided.

The two hydrophilic polymers were a polyether block amide (PEBAX 1657 by ATOFINA) and a Diglycol/CHDM/Isophthalate/SIP Copolymer (AQ 55S by Eastman Chemical), wherein "SIP" refers to sodiosulfo isophthalate monomer and "CHDM" is defined above. The two polymers were blended at a ratio of 35% wt and 65% wt, respectively.

The barium sulfate was compounded with the polymer blend through mixing in a counter-rotating twin screw extruder attached to a pelletizing die. Then both the PLA and the compounded resins were dried at 52° C. and fed by two plasticating screw extruders into a co-extrusion die manifold to produce a two-layered melt stream (200° C.) which was rapidly quenched on a chill roll after issuing from the die. By regulating the throughputs of the extruders, it was possible to adjust the thickness ratio of the layers in the cast laminate sheet. In this case, the thickness ratio of the two layers was adjusted at 1:1 with the thickness of both cast layers being approximately 450 μm. The cast sheet was then stretched at 75° C. first 3.3 times in the X-direction and then 3.3 times in the Y-direction. The stretched sheet final thickness was approximately 140 μm.

Example 2

A two-layered cast film is prepared in the following manner. The materials used in the preparation are:

(1) a PLA resin (NATUREWORKS 2002-D by Cargill-Dow) for the base layer; and (2) a compounded mix consisting of 32% by weight of a blend of two hydrophilic polymers and 68% by weight of barium sulfate (BLANC FIXE XR-HN from Sachtleben) with a mean particle size of 0.8 μm for the layer to be voided.

The two hydrophilic polymers were a polyether block amide (PEBAX 1657 by ATOFINA) and a Diglycol/CHDM/Isophthalate/SIP Copolymer (AQ 55S by Eastman Chemical). Unlike that of example 1, in this example the two polymers were blended at a ratio of 60% wt and 40% wt, respectively.

The Barium Sulfate was compounded with the polymer blend through mixing in a counter-rotating twin-screw extruder attached to a pelletizing die. Then both the PLA and the compounded resins were dried at 52° C. and fed by two plasticating screw extruders into a co-extrusion die manifold to produce a two-layered melt stream (200° C.) which was rapidly quenched on a chill roll after issuing from the die. By regulating the throughputs of the extruders, it was possible to adjust the thickness ratio of the layers in the cast laminate sheet. In this case, the thickness ratio of the two layers was adjusted at 1:1 with the thickness of both cast layers being approximately 450 μm. The cast sheet was then stretched at 75° C. first 3.3 times in the X-direction and then 3.3 times in the Y-direction. The stretched sheet final thickness was approximately 140 μm.

All of the final stretched films described above were evaluated by print testing to determine drytime, print density, and ozone fade.

Printing

Images were printed using a HP 5650 desk top printer with cartridges Black 58 (C6658AN) and cartridge tri-color 57 (C6657AN). The images contained 25%, 50%, 75% and 100% ink coverage blocks of cyan, magenta, yellow, and black colors. These blocks were approximately 1 cm by 1 cm in size. In addition, the images contained 100% ink coverage blocks of cyan, magenta, yellow, and black adjacent to each other for drytime measurements. These blocks were approximately 1 cm by 1.5 cm in size.

Drytime Testing

Immediately after ejection from the printer, the printed image was set on a flat surface. The four adjacent color blocks were then wiped with the index finger under normal pressure in one pass. The index finger was covered with a rubber finger cot. The drytime was rated as 5 when all of the color blocks smeared after wiping. The drytime was rated as 1 when no smearing was observed. Intermediate drytimes were rated between 1 and 5.

Image Density Measurement

The densities of the 100% ink coverage blocks in the printed images were measured using an X-RITE Densitometer Model 820. Densities of 1.0 or greater are considered acceptable for most imaging applications.

Ozone Fade

The densities of the 25%, 50%, 75% and 100% ink coverage blocks of cyan, magenta, yellow, and black colors were all measured. An interpolated or extrapolated point at which a density of 1.0 would be achieved was determined. The samples were then exposed to an ozone rich environment at 5 ppm ozone at a temperature of 25° C.

After 24 hours of exposure the density was determined at the same point as the original 1.0 density. The percent loss in density is reported as the ozone fade for that color.

Table 1 below shows the results of the testing described above. All films had instant drytime. It can be seen that the films with voided hydrophilic polymers, examples 1 and 2, have much higher printed densities and significantly lower ozone fades relative to the comparative film comprising a voided hydrophobic polymer.

TABLE 1

| SAMPLE | DRY-TIME | DENSITY C/M/Y/K | OZONE FADE (% loss) C/M/Y/K |
|---|---|---|---|
| Comparative 1 | 1 | 0.71/0.75/0.86/0.82 | 62.5/69.1/13.5/27.9 |
| Example 1 | 1 | 1.13/1.06/1.02/1.34 | 17.4/14.31/11.24/12.71 |
| Example 2 | 1 | 1.05/1.19/1.16/1.37 | 29.8/22.1/12.0/17.1 |

The invention has been described in detail with particular reference to certain preferred embodiments thereof, but it will be understood that variations and modifications can be effected within the spirit and scope of the invention.

The invention claimed is:

1. An inkjet recording element comprising a support having thereon at least one swellable, porous image-receiving layer comprising a blend of an ionic hydrophilic thermoplastic polymer and a non-ionic hydrophilic thermoplastic polymer, in a continuous phase, and interconnecting voids, which voids contain inorganic and/or organic void initiating particles, wherein the blend of an ionic hydrophilic thermoplastic polymer and a non-ionic hydrophilic thermoplastic polymer in the at least one swellable, porous image-receiving layer, in total, is present in an amount of greater than 40% by weight of the continuous phase in the at least one swellable, porous image-receiving layer.

2. The inkjet recording element of claim 1 wherein a volume % of voiding of the at least one swellable, porous image-recording layer is 50 to 75.

3. The inkjet recording element of claim 1 wherein the blend of an ionic hydrophilic thermoplastic polymer and a non-ionic hydrophilic thermoplastic polymer of the at least one swellable, porous image-receiving layer is thermally stable at 150° C.

4. The inkjet recording element of claim 1 wherein the blend of an ionic hydrophilic thermoplastic polymer and a non-ionic hydrophilic thermoplastic polymer comprises at least one hydrophilic thermoplastic polymer having a $T_g$ that is greater than 50° C.

5. The inkjet recording element of claim 1 wherein the blend of an ionic hydrophilic thermoplastic polymer and a non-ionic hydrophilic thermoplastic polymer comprises at least one hydrophilic thermoplastic polymer having a $T_g$ that is between 50° C. and 65° C.

6. The inkjet recording element of claim 1 wherein the ionic and non-ionic hydrophilic thermoplastic polymers in the at least one swellable, porous image-receiving layer are selected from the group consisting of polyester ionomers, polyether-polyamide copolymers, polyvinyloxazolines, polyvinylmethyloxazolines, polyethers, poly(methacrylic acids), n-vinyl amides, thermoplastic urethanes, polyether-polyamide copolymers, polyvinyl pyrrolidinones (PVP), and poly(vinyl alcohols), and derivatives and copolymers of the foregoing and combinations thereof.

7. The inkjet recording element of claim 1 wherein the blend of an ionic hydrophilic thermoplastic polymer and a non-ionic hydrophilic thermoplastic polymer in the at least one swellable, porous image-receiving layer comprises the ionic hydrophilic thermoplastic polymer and the non-ionic hydrophilic thermoplastic polymer in a weight ratio of 40:60 to 60:40.

8. The inkjet recording element of claim 7 wherein the ionic hydrophilic thermoplastic polymer is a polyester ionomer.

9. The inkjet recording element of claim 8 wherein the non-ionic hydrophilic thermoplastic polymer is a polyether group-containing thermoplastic copolymer.

10. The inkjet recording element of claim 9 wherein the polyether group-containing thermoplastic copolymer is a polyether-polyamide copolymer.

11. The recording element according to claim 10, wherein the polyether-polyimide copolymer has repeating copolymer segments, and the number of polyether groups in each of the copolymer segments is 2 to 20.

12. The inkjet recording element of claim 8 wherein the polyester ionomer is a sulfonated polyester.

13. The inkjet recording element of claim 8 wherein the polyester ionomer comprises ionic groups selected from the group consisting of sulfonic acid, disulfonylimino, and combinations thereof.

14. The inkjet recording element of claim 12 wherein the polyester ionomer comprises monomeric units derived from a sulfonic-acid substituted aromatic dicarboxylic acid selected from the group consisting of 5-sodium sulfoisophthalic acid, 2-sodium sulfoisophthalic acid, 4-sodium sulfoisophthalic acid, 4-sodium sulfo-2,6-naphthalene dicarboxylic acid, and combinations thereof.

15. The inkjet recording element of claim 1 wherein the at least one swellable, porous image-receiving layer is a biaxially stretched material.

16. The inkjet recording element of claim 1 further comprising a base layer between the at least one swellable, porous image-receiving layer and the support, wherein the base layer comprises a voided or non-voided polyester.

17. The inkjet recording element of claim 16 wherein the $T_g$ of the voided or non-voided polyester is not more than 75° C.

18. The inkjet recording element of claim 17 wherein the $T_g$ of the voided or non-voided polyester is between 55 and 70° C.

19. The inkjet recording element of claim 18 wherein the voided or non-voided polyester is a material comprising polylactic-acid or a copolymer thereof.

20. The inkjet recording element of claim 16 wherein the blend of an ionic hydrophilic thermoplastic polymer and a non-ionic hydrophilic thermoplastic polymer in the at least one swellable, porous image-receiving layer comprises at least one hydrophilic thermoplastic polymer having a $T_g$ that is within 15° C. of the $T_g$ of the voided or non-voided polyester in the base layer.

21. The inkjet recording element of claim 1 wherein the inorganic and/or organic void initiating particles are inorganic and have an average particle size of from about 0.3 to about 5 μm and make up from about 45 to about 75 weight % of the total weight of the at least one swellable, porous image-receiving layer.

22. The inkjet recording element of claim 21 wherein the inorganic void initiating particles are selected from the group consisting of barium sulfate, calcium carbonate, zinc sulfide, zinc oxide, titanium dioxide, silica, alumina, and combinations thereof.

23. An inkjet recording element comprising, on a support, a swellable, porous image-receiving layer, wherein the swellable, porous image-receiving layer is the product of melt extrusion and stretching of a composition comprising a blend of an ionic hydrophilic thermoplastic polymer and a non-ionic hydrophilic thermoplastic polymer, in a continuous phase, and interconnecting voids, which voids contain an inorganic or organic voiding agent, wherein the blend of an ionic hydrophilic thermoplastic polymer and a non-ionic hydrophilic thermoplastic polymer in the swellable, porous image-receiving layer, in total, is present in an amount of greater than 40% by weight of the continuous phase in the swellable, porous image-receiving layer.

24. An inkjet recording element comprising over a support in order over the support:

(a) a base layer, wherein the base layer comprises a voided or non-voided polyester polymer; and (b) at least one swellable, porous image-receiving layer comprising a blend of an ionic hydrophilic thermoplastic polymer and a non-ionic hydrophilic thermoplastic polymer, in a continuous phase, and interconnecting voids, which voids contain an inorganic or organic voiding agent, wherein the blend of an ionic hydrophilic thermoplastic polymer and a non-ionic hydrophilic thermoplastic polymer in the at least one swellable, porous image-receiving layer, in total., is present in an amount of greater than 40% by weight of the continuous phase in the at least one swellable, porous image-receiving layer.

25. The inkjet recording element of claim 24 wherein the blend of an ionic hydrophilic thermoplastic polymer and a non-ionic hydrophilic thermoplastic polymer in the at least one swellable, porous image-receiving layer comprises at least one hydrophilic thermoplastic polymer having a $T_g$ that is between 50° C. and 65° C., and the $T_g$ of the voided or non-voided polyester polymer is not more than 75° C., and the blend of an ionic hydrophilic thermoplastic polymer and a non-ionic hydrophilic thermoplastic polymer in the at least one swellable, porous image-receiving layer comprises at least one hydrophilic thermoplastic polymer having a $T_g$ that is within 15° C. of the $T_g$ of the voided or non-voided polyester polymer in the base layer.

26. A method of making an inkjet recording element according to claim 1, which method comprises:

(a) blending inorganic and/or organic void initiating particles into a melt comprising a blend of an ionic hydrophilic thermoplastic polymer and a non-ionic hydrophilic thermoplastic polymer;

(b) forming a sheet comprising a layer of the melt by extrusion;

(c) stretching the sheet biaxially to form interconnected microvoids around the inorganic and/or organic particles to form a swellable, porous image-receiving layer comprising the blend of an ionic hydrophilic thermoplastic polymer and a non-ionic hydrophilic thermoplastic polymer, in a continuous phase, and interconnecting voids, which voids contain the inorganic and/or organic void initiating particles, wherein the blend of an ionic hydrophilic thermoplastic polymer and a non-ionic hydrophilic thermoplastic polymer in the swellable, porous image-receiving layer, comprising in total, is present in an amount of greater than 40% by weight of the continuous phase in the swellable, porous image-receiving laver; and (d) applying the biaxially stretched sheet over a support.

27. The method of claim 26 wherein the swellable, porous image-receiving layer is stretched at a temperature of under 75° C.

28. The method of claim 26 wherein the swellable, porous image-receiving layer has a thickness of from about 20 to about 80 μm.

29. The method of claim 26 wherein the inorganic and/or organic void initiating particles are in the range of 0.1 to 1.0 micrometers in average diameter and make up from about 45 to about 75 weight % of the total weight of the swellable, porous image-receiving layer.

30. The method of claim 26 wherein the swellable, porous image-receiving layer containing inorganic and/or organic particles is coextruded with at least one other layer to form a multilayer film, wherein the at least one other layer comprises a voided or non-voided polyester material adjacent to and integral with the swellable, porous image-receiving layer, which polyester material has a Tg under 75° C.

31. The method of claim 30 wherein the polyester material is a polylactic-acid-based material.

32. The method of claim 26 wherein the sheet is stretched in both directions simultaneously or the sheet is sequentially stretched in a machine direction first followed by a transverse direction.

33. An inkjet printing method, comprising the steps of:

A) providing an inkjet printer that is responsive to digital data signals;

B) loading the printer with the inkjet recording element of claim 1;

C) loading the printer with an inkjet ink; and

D) printing on the inkjet recording element using the inkjet ink in response to the digital data signals.

34. The inkjet recording element of claim 1 wherein the ionic and non-ionic hydrophilic thermoplastic polymers in the at least one swellable, porous image-receiving layer are selected from the group consisting of polyester ionomers, polyether-polyamide copolymers, poly (vinyl alcohol) (PVA), polyvinyloxazolines, polyvinylmethyloxazolines, polyethers, poly(methacrylic acids), n-vinyl amides, thermoplastic urethanes, polyvinyl pyrrolidinones (PVP), copolymers of poly(ethylene oxide) and poly(vinyl alcohol) (PEO-PVA), copolymers of poly(ethylene vinyl alcohol) and poly (vinyl alcohol), derivitized poly(vinyl alcohol) polymers having at least one hydroxyl group replaced by ether or ester groups, and carboxylated PVA in which an acid group is present in a comonomer.

* * * * *

UNITED STATES PATENT AND TRADEMARK OFFICE

CERTIFICATE OF CORRECTION

PATENT NO. : 7,824,030 B2
APPLICATION NO. : 11/210169
DATED : November 2, 2010
INVENTOR(S) : Laney et al.

It is certified that error appears in the above-identified patent and that said Letters Patent is hereby corrected as shown below:

In Column 25, Claim 11, line 22, delete "polyimide" and insert -- polyamide --.

In Column 26, Claim 24, line 30, delete "total.," and insert -- total, --.

In Column 26, Claim 26, line 64, delete "comprising".

Signed and Sealed this
Twenty-ninth Day of November, 2011

David J. Kappos

*Director of the United States Patent and Trademark Office*